(12) United States Patent
Xue et al.

(10) Patent No.: US 11,805,511 B2
(45) Date of Patent: Oct. 31, 2023

(54) CROSS-SLOT SCHEDULE FOR NEW RADIO (NR) SIDELINK (SL)

(71) Applicant: QUALCOMM Incorporated, San Diego, CA (US)

(72) Inventors: Yisheng Xue, San Diego, CA (US); Xiaoxia Zhang, San Diego, CA (US); Jing Sun, San Diego, CA (US); Chih-Hao Liu, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 17/408,148

(22) Filed: Aug. 20, 2021

(65) Prior Publication Data

US 2023/0057681 A1 Feb. 23, 2023

(51) Int. Cl.
*H04W 72/1263* (2023.01)
*H04L 1/00* (2006.01)
*H04L 5/00* (2006.01)
*H04W 72/0446* (2023.01)
*H04W 72/23* (2023.01)

(52) U.S. Cl.
CPC ....... *H04W 72/1263* (2013.01); *H04L 1/0004* (2013.01); *H04L 5/0051* (2013.01); *H04W 72/0446* (2013.01); *H04W 72/23* (2023.01)

(58) Field of Classification Search
CPC ......... H04W 72/1263; H04W 72/0446; H04W 72/14; H04L 1/0004; H04L 5/0051
USPC ......................................................... 370/329
See application file for complete search history.

(56) References Cited

U.S. PATENT DOCUMENTS

| | | | |
|---|---|---|---|
| 2020/0037343 A1* | 1/2020 | He | H04L 1/1893 |
| 2020/0229171 A1* | 7/2020 | Khoryaev | H04B 7/0413 |
| 2021/0306824 A1* | 9/2021 | Li | H04L 1/1887 |
| 2022/0210804 A1* | 6/2022 | Hwang | H04L 5/0055 |
| 2022/0225292 A1* | 7/2022 | Mohammad Soleymani | H04L 1/0038 |

* cited by examiner

*Primary Examiner* — Intekhaab A Siddiquee
(74) *Attorney, Agent, or Firm* — Norton Rose Fulbright US LLP/Qualcomm Incorporated

(57) ABSTRACT

This disclosure provides systems, methods, and devices for wireless communication that support cross-slot scheduling of sidelink transmissions in a wireless communication system. A transmitting user equipment (UE) in communication with a receiving UE over a sidelink transmits cross-slot schedule information to the receiving UE at a time prior to a first slot over which a physical sidelink shared channel (PSSCH) transmission is to be transmitted to the receiving UE. The cross-slot schedule information includes information that is sufficient to decode the PSSCH transmission received by the receiving UE at the first slot, without requiring the receiving UE to decode a physical sidelink control channel (PSCCH) transmission including a sidelink control information (SCI) message received during the first slot. In aspects, the PSSCH transmission may be decoded in parallel with the PSCCH transmission received in the first slot.

26 Claims, 10 Drawing Sheets

CROSS-SLOT SCHEDULE FOR NEW RADIO (NR) SIDELINK (SL)

TECHNICAL FIELD

Aspects of the present disclosure relate generally to wireless communication systems, and more particularly, to cross-slot scheduling of sidelink transmissions in a wireless communication system.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes receiving cross-slot schedule information at a time prior to a first slot, the first slot configured for receiving a physical sidelink shared channel (PSSCH) transmission from another UE over a sidelink. In aspects, the cross-slot schedule information is sufficient to decode the PSSCH transmission without requiring decoding of a physical sidelink control channel (PSCCH) transmission received during the first slot. The method also includes receiving the PSSCH transmission from the another UE during the first slot, and decoding the PSSCH transmission based on the cross-slot schedule information.

In an additional aspect of the disclosure, a method of wireless communication performed by a UE includes transmitting cross-slot schedule information to another UE at a time prior to a first slot, the first slot configured for transmitting a PSSCH transmission to the another UE over a sidelink. In aspects, the cross-slot schedule information includes sufficient information for the another UE to decode the PSSCH transmission without requiring the another UE to decode a PSCCH transmission transmitted to the another UE during the first slot. The method also includes transmitting the PSSCH transmission to the another UE during the first slot. In aspects, the another UE is configured to decode the PSSCH transmission based on the cross-slot schedule information.

In an additional aspect of the disclosure, a UE includes at least one processor and a memory coupled to the at least one processor. The at least one processor stores processor-readable code that, when executed by the at least one processor, is configured to perform operations including receiving cross-slot schedule information at a time prior to a first slot, the first slot configured for receiving a PSSCH transmission from another UE over a sidelink. In aspects, the cross-slot schedule information is sufficient to decode the PSSCH transmission without requiring decoding of a PSCCH transmission received during the first slot. The operations also include receiving the PSSCH transmission from the another UE during the first slot, and decoding the PSSCH transmission based on the cross-slot schedule information.

In an additional aspect of the disclosure, a UE includes at least one processor and a memory coupled to the at least one processor. The at least one processor stores processor-readable code that, when executed by the at least one processor, is configured to perform operations including transmitting cross-slot schedule information to another UE at a time prior to a first slot, the first slot configured for transmitting a PSSCH transmission to the another UE over a sidelink. In aspects, the cross-slot schedule information includes sufficient information for the another UE to decode the PSSCH transmission without requiring the another UE to decode a PSCCH transmission transmitted to the another UE during the first slot. The operations also include transmitting the PSSCH transmission to the another UE during the first slot. In aspects, the another UE is configured to decode the PSSCH transmission based on the cross-slot schedule information.

In an additional aspect of the disclosure, a non-transitory computer-readable medium stores instructions that, when executed by a processor, cause the processor to perform operations. The operations include receiving, by the UE, cross-slot schedule information at a time prior to a first slot, the first slot configured for receiving a PSSCH transmission from another UE over a sidelink. In aspects, the cross-slot schedule information is sufficient to decode the PSSCH transmission without requiring decoding of a PSCCH transmission received during the first slot. The operations also include receiving the PSSCH transmission from the another UE during the first slot, and decoding the PSSCH transmission based on the cross-slot schedule information.

In an additional aspect of the disclosure, a non-transitory computer-readable medium stores instructions that, when executed by a processor, cause the processor to perform operations. The operations include transmitting, by a UE, cross-slot schedule information to another UE at a time prior to a first slot, the first slot configured for transmitting a PSSCH transmission to the another UE over a sidelink. In aspects, the cross-slot schedule information includes sufficient information for the another UE to decode the PSSCH transmission without requiring the another UE to decode a PSCCH transmission transmitted to the another UE during the first slot. The operations also include transmitting the PSSCH transmission to the another UE during the first slot. In aspects, the another UE is configured to decode the PSSCH transmission based on the cross-slot schedule information.

In an additional aspect of the disclosure, an apparatus includes means for receiving, by a UE, cross-slot schedule information at a time prior to a first slot, the first slot configured for receiving a PSSCH transmission from another UE over a sidelink. In aspects, the cross-slot schedule information is sufficient to decode the PSSCH transmission without requiring decoding of a PSCCH transmission received during the first slot. The apparatus also includes means for receiving the PSSCH transmission from the another UE during the first slot, and means for decoding the PSSCH transmission based on the cross-slot schedule information.

In an additional aspect of the disclosure, an apparatus includes means for transmitting, by a UE, cross-slot schedule information to another UE at a time prior to a first slot, the first slot configured for transmitting a PSSCH transmission to the another UE over a sidelink. In aspects, the cross-slot schedule information includes sufficient information for the another UE to decode the PSSCH transmission without requiring the another UE to decode a PSCCH transmission transmitted to the another UE during the first slot. The apparatus also includes means for transmitting the PSSCH transmission to the another UE during the first slot. In aspects, the another UE is configured to decode the PSSCH transmission based on the cross-slot schedule information.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
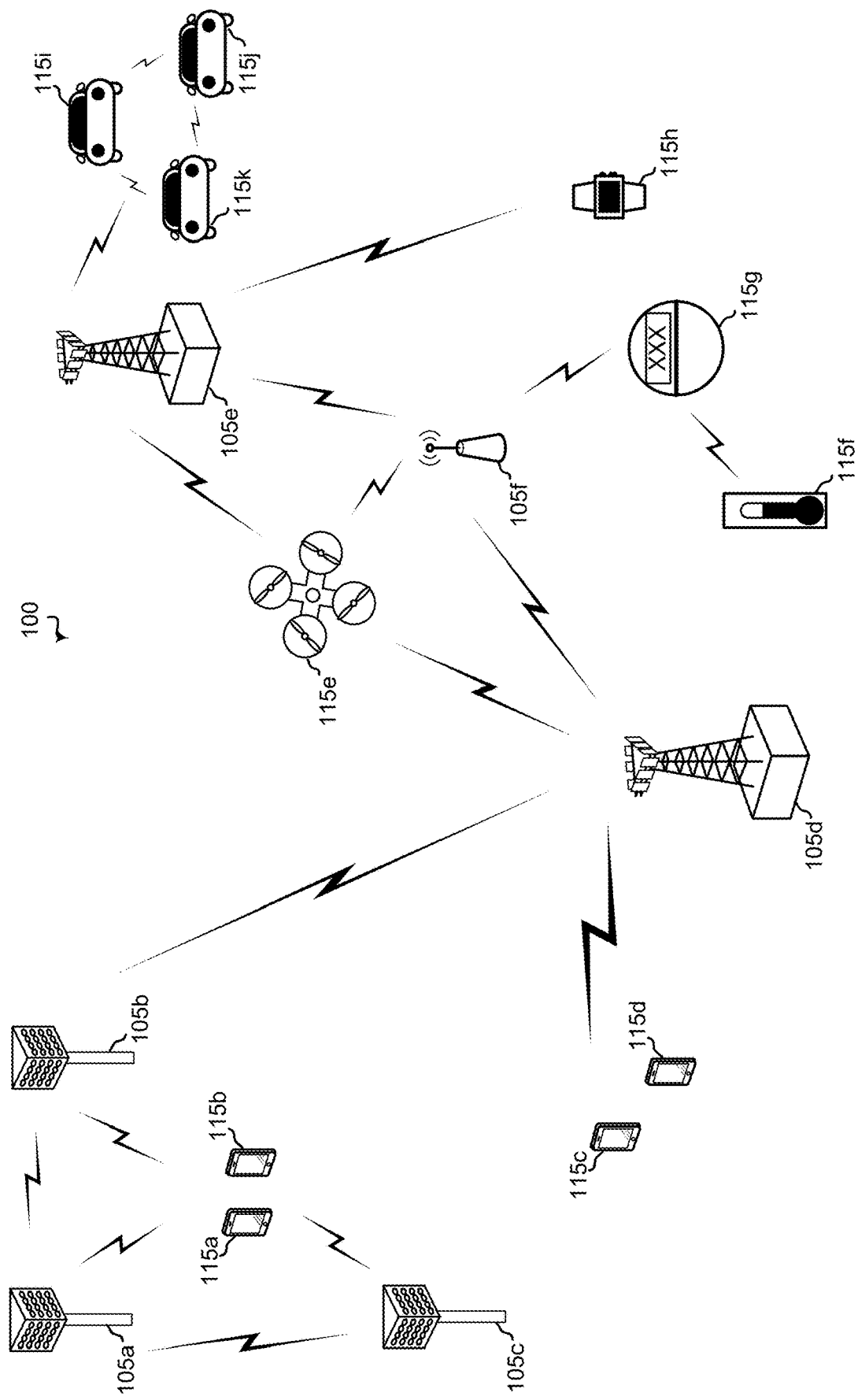
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
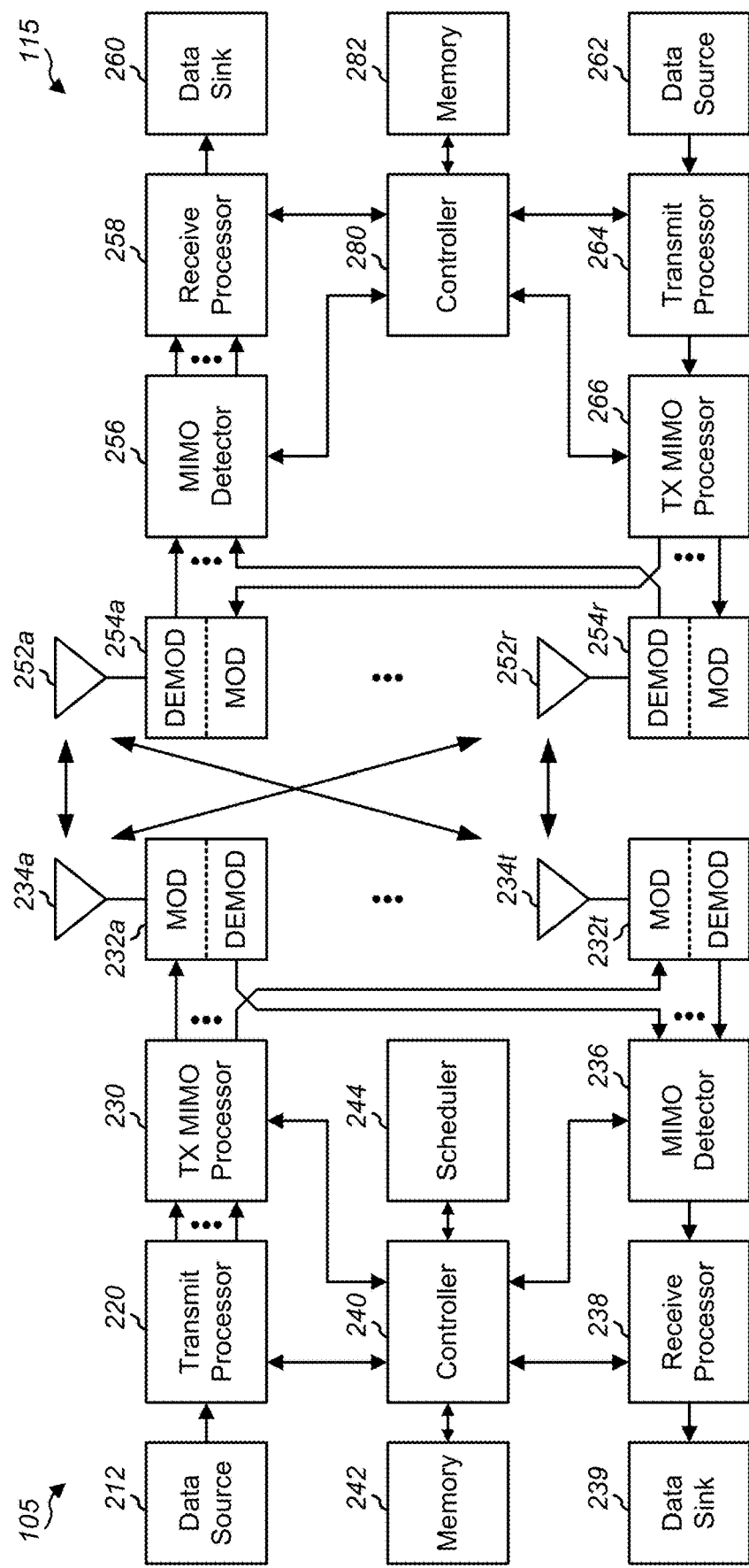
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 8 and 9, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Current implementations of wireless communication systems implement sidelink communications in which a UE communicates with other UEs directly over a sidelink. Sidelink communications may be particularly useful in Internet of Things (IoT) and/or vehicle-to-everything (V2X) application, in which delivering safety related messages in a sub-6 GHz licensed bands is particularly important.

In some implementations, SL communications between two UEs may operate in one of various modes. In particular, two modes for channel/resource allocation have been specified in current wireless communication system implementations. One such mode, also known as sidelink mode 2, involves a transmitting node autonomously scheduling sidelink transmissions to a receiving UE(s) over the sidelink without the transmitting UE obtaining a transmission grant from a serving base station before it is allowed to transmit to the receiving UE over the sidelink. In another mode, also known as sidelink mode 1, a base station may schedule the sidelink transmissions between the transmitting UE and the receiving UE(s). For example, in sidelink mode 1, a UE may transmit to another UE over the sidelink, but the transmitting UE must obtain a transmission grant (e.g., in a downlink control information (DCI) message) from the serving base station before it is allowed to transmit to the receiving UE over the sidelink. In sidelink mode 1, without a transmission grant, the transmitting UE is not allowed to transmit to the receiving UE over the sidelink. However, once the base station grants the transmission grant to the transmitting UE, the transmitting UE may transmit to the receiving UE over the sidelink.

In implementations, the sidelink transmission may follow a particular scheme. For example, the transmitting UE may transmit control information in a sidelink control information (SCI) message to the receiving UE. The receiving UE may use the control information in the SCI to receive and/or to decode a data transmission (e.g., a co-subchannel physical sidelink shared channel (PSSCH) transmission) from the transmitting UE. In current implementations, the SCI may be transmitted in a two-stage procedure, which include stage 1 SCI and stage 2 SCI. In stage 1 SCI, which may be transmitted to the receiving UE in a physical sidelink control channel (PSCCH) transmission, the transmitting UE may transmit information that may indicate resource reservations for other sidelink UEs, as well as information on how to demodulate the co-subchannel PSSCH transmission (e.g., information including modulation and coding scheme (MCS), demodulation reference signal (DMRS) configuration, etc.), and information on how to decode the stage 2 SCI. In stage 2 SCI, which may be transmitted in the PSSCH transmission (e.g., may be piggybacked onto the co-subchannel PSSCH transmission), the transmitting UE may transmit control information on how to decode and process the PSSCH transmission (e.g., information including level 1 (L1) source ID, level 2 (L2) destination ID, sidelink SL process control, etc.), and information that may not be able to be carried in stage 1 SCI. With the SCI control information, the receiving UE may receive and decode the PSSCH transmission and may determine feedback resources for reporting feedback associated with the PSSCH transmission.

Current sidelink implementations, may perform same-slot scheduling, in which the SCI (stage 1 and stage 2) and the PSSCH transmission associated with the SCI may be transmitted in a same slot. Borrowing language from Uu implementations, this same-slot scheduling may be akin to implementing a K0=0 scheme, in which schedule and transmission occur in the same slot. In these implementations, the receiving UE may decode the SCI by performing blind SCI decoding, and may attempt to decode the SCI within a resource pool. If the decoded SCI is intended for the receiving UE, the receiving UE may proceed to decode the PSSCH transmission.

However, it has been determined that same-slot scheduling features may come at a performance cost in sidelink communications. In particular, same-slot scheduling of the SCI and PSSCH may affect the latency of sidelink communication. For example, a receiving UE receiving an SCI message and an associated PSSCH transmission in a same slot may suffer a time-line penalty, which may affect latency, as the receiving UE may not be allowed or able to decode the PSSCH transmission until the SCI message is decoded. Because of this, any system implementing or requiring low-latency operations (e.g., ultra-reliably low-latency communications (URLLC), etc.) may be penalized as the low-latency may be affected by the same-slot scheduling approach of current sidelink implementations.

Various aspects of the present disclosure are directed to systems and methods that support cross-slot scheduling of sidelink transmissions in a wireless communication system. In aspects, a receiving UE may be configured (e.g., via a configured grant (CG)) to receive a data transmission (e.g., a PSSCH transmission) from a transmitting UE over a sidelink at a first slot. In aspects, the receiving node may be configured to receive, and the transmitting node may be configured to transmit, cross-slot schedule information at a time prior to the first slot over which the data transmission to the receiving UE is to take place. In some aspects, the cross-slot schedule information may be transmitted to the receiving UE at a slot, or at slots, that occur prior to the first slot. The cross-slot schedule information may include information that is sufficient to decode the PSSCH transmission received by the receiving UE at the first slot, without requiring the receiving UE to decode a PSCCH transmission (e.g., a PSCCH transmission including an SCI message) received during the first slot. In this manner, the receiving UE may directly decode the PSSCH transmission at the first slot when the PSSCH transmission is received, without having to decode, or without having to wait to successfully decode, the SCI associated with the PSSCH transmission and that is received in the same-slot as the PSSCH transmission. In some aspects, the PSSCH transmission may be decoded in parallel with the PSCCH transmission received in the first slot. As such, the cross-slot schedule of aspects of the present disclosure may provide a mechanism to address the deficiencies of the same-slot scheduling scheme of current sidelink implementations, (e.g., the low latency penalties resulting from same-slot scheduling of the SCI and PSSCH).

In some aspects, the cross-slot schedule techniques disclosed herein may be applicable to implementations where SCI repetition may be used. In these aspects, SCI may be repeated in a plurality of reception opportunities configured for the receiving UE. In some aspects, the SCI repetitions may be accumulated and/or combined to facilitate decoding of the SCI based on the combined SCI repetitions. In these aspects, using cross-slot scheduling techniques, the PSSCH transmission that is to be received at the first slot, associated with the repeated SCI message, may be configured with a more aggressive MCS that may require a number of repetitions greater than the actual number of repetitions to be decoded. In these aspects, the PSSCH may still be successfully decoded at the first slot without having to decode, or without having to wait to decode, the corresponding repeated SCI.

Figure 3:
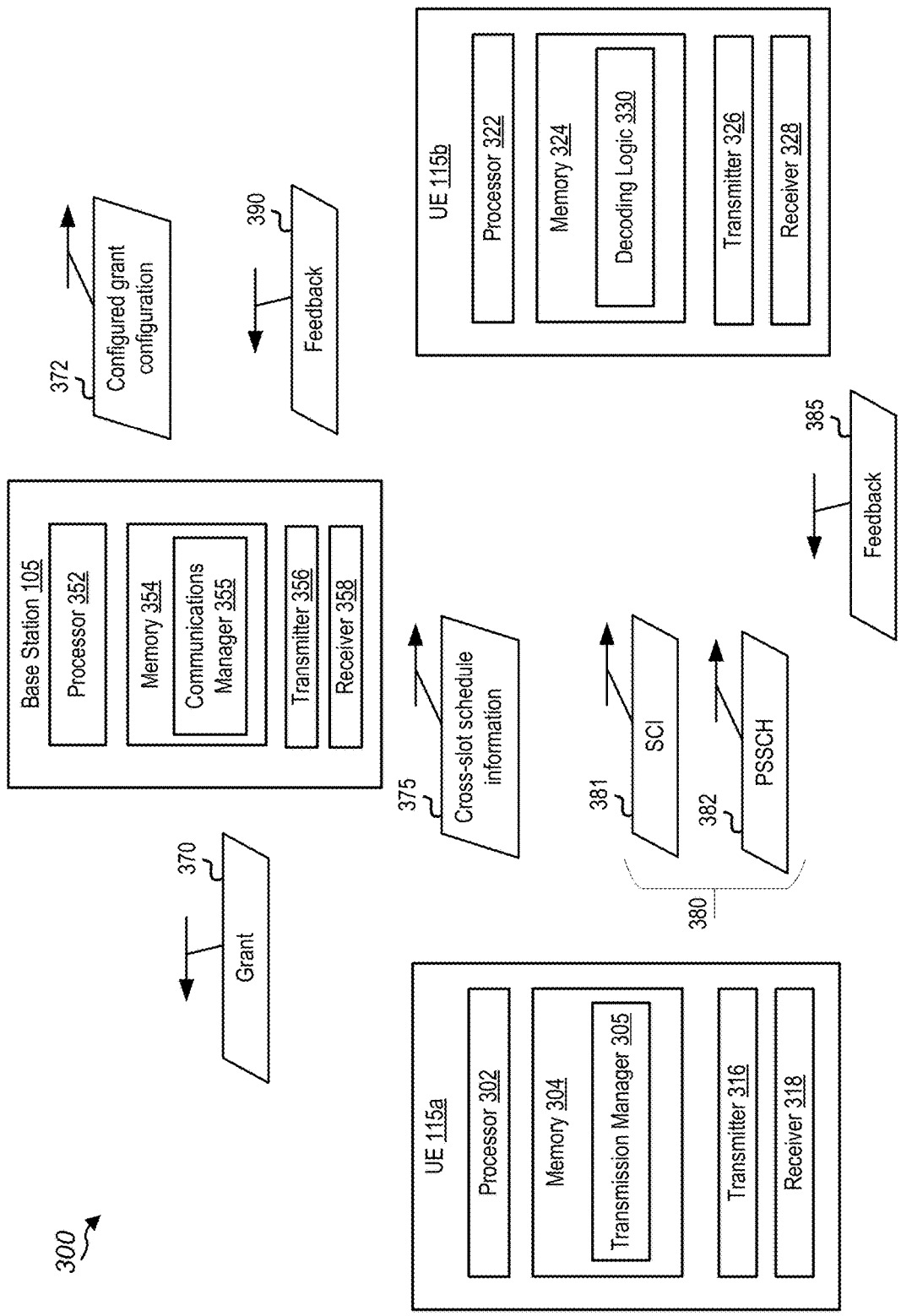
FIG. 3 is a block diagram of an example wireless communications system that supports cross-slot scheduling of sidelink transmissions in a wireless communication system according to one or more aspects of the present disclosure.

FIG. 3 is a block diagram of an example wireless communications system 300 that supports cross-slot scheduling of sidelink transmissions in a wireless communication system according to one or more aspects of the present disclosure. In some examples, wireless communications system 300 may implement aspects of wireless network 100. Wireless communications system 300 includes UE 115a, UE 115b, and base station 105, and may implement a sidelink communication scheme (e.g., sidelink mode 1 or sidelink mode 2). In aspects, UE 115a and UE 115b may be in communication over a sidelink. In some aspects, UE 115a and UE 115b may also each be in communication with base station 105, and may operate in sidelink mode 1. In the discussion that follows, UE 115a may be described as a transmitting UE and UE 115b may be described as a receiving UE, and in this context UE 115a may transmit data to UE 115b (e.g., cross-slot schedule information, SCI messages, PSCCH transmissions, and/or PSSCH transmissions). In aspects implementing sidelink mode 1, base station 105 may transmit a transmission grant to UE 115a, and may configure UE 115b for configured reception. However, this description of UE 115a as a transmitting UE and UE 115b as a receiving UE, as well as the description of system 300 as including two UEs and one base station, is merely for illustrative purposes and not intended to be limiting in any way. As such, wireless communications system 300 may generally include additional transmitting and/or receiving UEs, and may include more than one base station 105.

UE 115a may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store transmission manager 305. In aspects, transmission manager 305 may be configured to perform operations for transmitting information and data to UE 115b (e.g., the receiving UE) for decoding PSSCH transmission 382 received by UE 115b during a first slot based, at least in part, on cross-slot schedule information 371 received by UE 115b prior to the first slot in accordance with aspects of the present disclosure.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

UE 115b also may include a variety of components (such as structural, hardware components) used for carrying out one or more functions described herein. For example, these components may include one or more processors 322 (hereinafter referred to collectively as "processor 322"), one or more memory devices 324 (hereinafter referred to collectively as "memory 324"), one or more transmitters 326 (hereinafter referred to collectively as "transmitter 326"), and one or more receivers 328 (hereinafter referred to collectively as "receiver 328"). Processor 322 may be configured to execute instructions stored in memory 324 to perform the operations described herein. In some implementations, processor 322 includes or corresponds to one or more of receive processor 258, transmit processor 264, and controller 280, and memory 324 includes or corresponds to memory 282.

Memory 324 includes or is configured to store decoding logic 330. In aspects, decoding logic 330 may be configured to decode PSSCH transmission 382 received by UE 115b from UE 115a during a first slot based, at least in part, on cross-slot schedule information 371 received by UE 115b prior to the first slot without requiring UE 115b to decode or successfully decode SCI message 381, in accordance with aspects of the present disclosure.

Transmitter 326 is configured to transmit reference signals, control information and data to one or more other devices, and receiver 328 is configured to receive references signals, synchronization signals, control information and data from one or more other devices. For example, transmitter 326 may transmit signaling, control information and data to, and receiver 328 may receive signaling, control information and data from, base station 105. In some implementations, transmitter 326 and receiver 328 may be integrated in one or more transceivers. Additionally or alternatively, transmitter 326 or receiver 328 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store communications manager 355. In aspects, communications manager 355 may be configured to perform operations for configuring and/or scheduling sidelink transmissions between UE 115a and UE 115b. In aspects, configured communications manager 355 may be configured to send a transmission grant 370 to UE 115a specifying resources for a sidelink data transmission to be transmitted to UE 115b. In some aspects, transmission grant 370 may include a configured grant configuration that may define configured grant occasions in which UE 115a may include an SCI message or SCI repetitions of an SCI message to be transmitted to UE 115b. In aspects, communications manager 355 may also be configured to send configured grant configuration 375 to UE 115b, specifying a configured grant configuration for UE 115b to receive SCI message (or SCI repetitions) from UE 115a.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, base station 105 transmits transmission grant 370 to UE 115a. In aspects, transmission grant 370 may grant UE 115a a grant to transmit a sidelink transmission to UE 115b. In some aspects, base station 105 may also transmit configured grant configuration 372 to UE 115b, configuring UE 115b to receive transmissions from UE 115a over the sidelink in accordance with transmission grant 370. In some aspects, configured grant configuration 372 may represent a configured reception configuration configuring UE 115b to perform or conduct configured reception of a sidelink transmissions from UE 115a. In these aspects, transmission grant 370 may be based on the configured reception configuration of UE 115b. In this manner, base station 105 may configure UE 115a (e.g., via transmission grant 370) to transmit sidelink transmissions in particular configured reception occasions, as configured for the receiving UE 115b.

During operation of wireless communications system 300, transmitting UE 115a may transmit cross-slot schedule information 375 to receiving UE 115b at a time prior to slot 380. In aspects, cross-slot schedule information 375 may include information that is sufficient for receiving UE 115b to decode PSSCH transmission 380 transmitted in slot 380 without requiring decoding of SCI message 381 (transmitted in a PSCCH transmission) transmitted in the same slot 380 and received by receiving UE during the same slot 380.

During operation of wireless communications system 300, transmitting UE 115a may transmit PSSCH transmission 382 and a PSSCH transmission including SCI message 381 concurrently in the same slot 380. In aspects, SCI message 381 may represent a stage-2 SCI message. UE 115b may decode the PSSCH transmission 382 based, at least in part, on the cross-slot schedule information 375 received prior to slot 380. In some aspects, UE 115b may decode PSSCH transmission 382 in parallel with decoding the PSCCH transmission in which SCI message 381 is received. In this manner, UE 115b may receive, prior to receiving PSSCH transmission 382 in slot 380, in the cross-slot schedule information, sufficient information to perform direct PSSCH decoding at slot 380 without having to decode the co-subchannel PSCCH that includes SCI message 381. Put another way, the cross-slot schedule information may represent sufficient information for the receiving UE to perform direct PSSCH decoding without decoding the co-subchannel PSCCH at the specified sub-channel(s) at slot s+K0, where K0>0.

In aspects, cross-slot schedule information 375 may include information that is required in order to successfully decode PSSCH transmission 382. In aspects, cross-slot schedule information 375 may include one or more, or in some cases at least, an indication of a sub-channel over which the PSSCH transmission is transmitted from the transmitting UE 115a, an indication of the DMRS scrambling to be used for decoding PSSCH transmission 382, a sidelink process number, a new data indicator (NDI), a redundant version (RV) indicator, a DMRS pattern, a number associated with a port of the DMRS, an MCS used on PSSCH transmission 382, a table including additional MCS used on PSSCH transmission 382, an indication of a format of SCI message 381 transmitted in a PSCCH transmission, a beta-offset indicator, a level 1 (L1) source identification (ID), and/or an L1 destination ID.

In aspects, the cross-slot scheduling techniques described herein, in which cross-slot schedule information sufficient to direct decode and/or demodulate PSSCH transmission 382 at slot 380 is received prior to slot 380, may enable UE 115b to avoid a timeline penalty for front-loaded short-duration (e.g., occupying only 2 to 4 early symbols) PSSCH transmissions. Avoiding such symbol-level timeline penalty together with symbol-level hybrid automatic repeat request (HARQ) response resource may be beneficial, especially in situations, for example, that are sensitive to HARQ response timelines. For example, symbol-level HARQ response resources may be obtained by configuring receiving UE 115b with sub-slot PUCCH resources (e.g., in an advanced Mode 1 implementation), where receiving UE 115b may be within base station 105 coverage.

Figure 4:
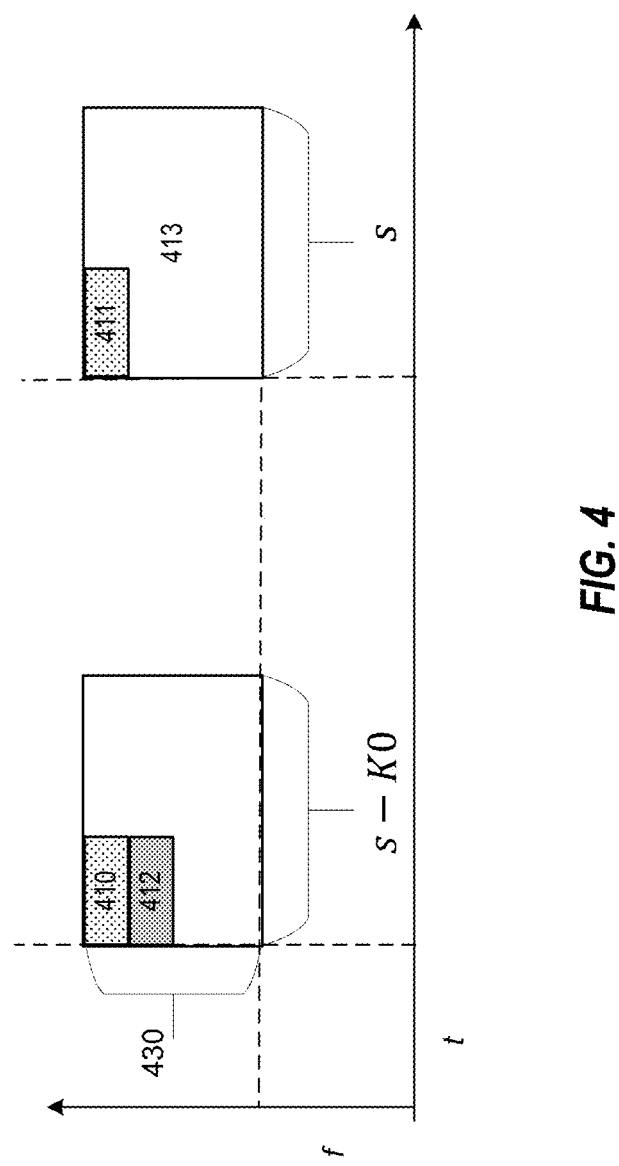
FIG. 4 is a block diagram illustrating an example of a cross-slot schedule approach implemented in accordance with aspects of the present disclosure.

FIG. 4 is a block diagram illustrating an example of a cross-slot schedule approach implemented in accordance with aspects of the present disclosure. As shown in FIG. 4, at slot s−K0, where K0>0, and which may occupy subchannel 430, a receiving UE (e.g., UE 115b) may receive cross-slot schedule information 412 from a transmitting UE (e.g., UE 115a). In aspects, cross-slot schedule information 412 may represent information that is sufficient information for the receiving UE to perform direct PSSCH decoding of PSSCH transmission 413 received at slots without having to decode PSCCH transmission 411, which includes an SCI message, received at slots and over the same subchannel 430. The receiving UE may receive, at slot s, PSSCH transmission 413 and PUCCH transmission 411 occupying subchannel 413. In aspects, PUCCH transmission 411 may include an SCI message for decoding PSSCH transmission 413. In aspects, the receiving UE may direct decode PSSCH transmission 413 without having to decode PUCCH transmission 411. The receiving UE may decode PSSCH transmission 413 based, at least in part, on cross-slot schedule information 412 received during the prior slot s−K0. In aspects, the receiving UE may decode PUCCH transmission 411 in parallel with the decoding of PSSCH transmission 413. In this manner, a HARQ response for PSSCH transmission 413 may be generated without a timeline penalty due to same-slot SCI decoding, as described above.

Figure 5:
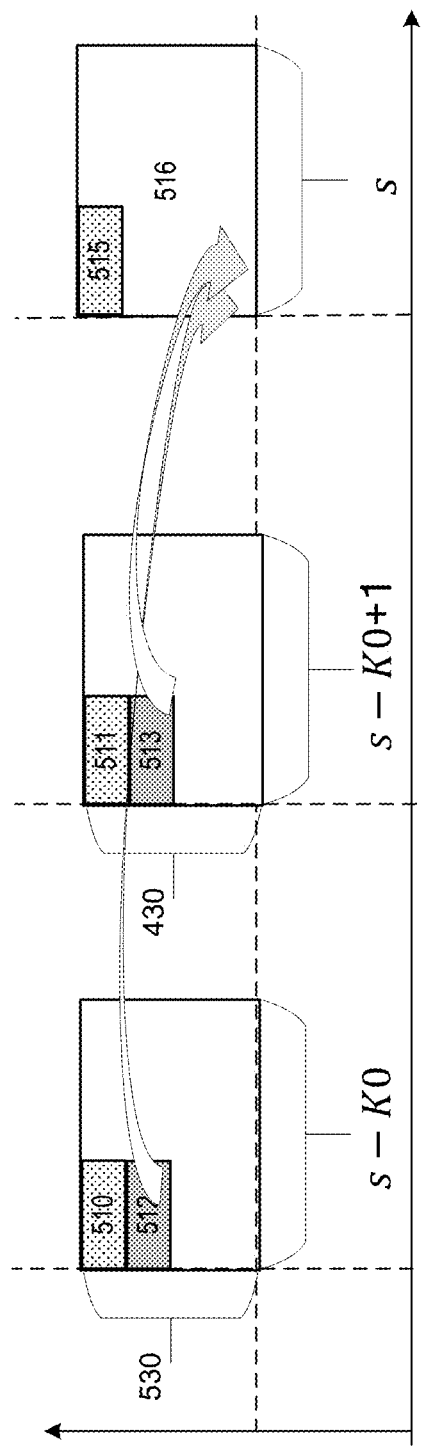
FIG. 5 is a block diagram illustrating an example of a cross-slot schedule approach implemented with SCI repetitions in accordance with aspects of the present disclosure.

FIG. 5 is a block diagram illustrating an example of a cross-slot schedule approach implemented with SCI repetitions in accordance with aspects of the present disclosure. As shown in FIG. 5, SCI repetition may be used. In this example, SCI repetitions may be used to transmit a combinable SCI message in a PSCCH transmission that is repeated in each slot. The SCI message in this example may be able to be decoded via chase-combining over two slots. In this case, at slots s−K0 and s−K0+1, where K0>0, SCI message repetitions 510 and 511 may be transmitted, respectively. In aspects, in each of slots s−K0 and s−K0+1, cross-slot schedule information 512 and 513 may be included, respectively. In some aspects, cross-slot schedule information 512 and 513 may represent the same information, or may represent subsets of the complete cross-slot schedule information (e.g., complete cross-slot schedule information sufficient to decode PSSCH transmission 516 at slot s). As the repeated SCI message in SCI message repetitions 510 and 511 may be decoded over two slots (e.g., slots s−K0 and s−K0+1), a more aggressive MCS may be used on PSSCH transmission 516, which may require two or more retransmissions to be decoded. By providing cross-slot schedule information 512 and 513 prior to slot s, there may be an increased possibility that PSSCH transmission 516 may be decoded at slot s without decoding, or without having to decode, SCI message 515 corresponding to PSSCH transmission 516. In aspects, the receiving UE may decode PSSCH transmission 516 without having to decode SCI message 515. The receiving UE may decode PSSCH transmission 516 based, at least in part, on cross-slot schedule information 512 and/or 513 received during the prior slots s−K0 and s−K0+1. In this manner, a HARQ response for PSSCH transmission 516 may be generated even when decoding of the co-subchannel SCI (e.g., SCI message 515) may fail.

With reference back to FIG. 3, during operation of wireless communications system 300, UE 115*b* may transmit a feedback message 485 to UE 115*a* indicating either a NACK or an ACK for PSSCH transmission 382. In some aspects, UE 115*b* may be configured to generate and transmit a feedback message 485 to UE 115*a* over a physical sidelink feedback channel (PSFCH). In aspects, feedback message 485 may indicate either a NACK or an ACK associated with PSSCH transmission 482. In some aspects, UE 115*b* may transmit a feedback message 490 to base station 105 indicating either a NACK or an ACK with respect to PSSCH transmission 482. Feedback message 490 may be transmitted to base station 105 via a configured sub-slot based PUCCH resource for low-latency.

In some aspects, cross-slot schedule information 375 may be included or piggybacked into a legacy stage-two SCI message that is transmitted to the receiving UE at a time prior to the slot in which the PSSCH transmission is received by the receiving UE. In aspects, the stage-two SCI message includes or provides control information for the co-subchannel PSSCH transmission. In this case, cross-slot schedule information 375 may be included or piggybacked in a stage-two SCI message. For example, at a time prior to slot 380 (e.g., at slots s–K0, with K0>0, and with slot 380 equal to slot s), receiving UE 115*b* may receive cross-slot schedule information 375 in a stage-two SCI message. At slot 380 (e.g., slot s), receiving UE 115*b* may perform direct PSSCH decoding of PSSCH transmission 382 based, at least in part, on cross-slot schedule information 375 received at slot s–K0. In these aspects, even if UE 115*b* fails to receive cross-slot schedule information 375 at slot s–K0, UE 115*b* may still be able to decode PSSCH transmission 382 based on decoding of co-subchannel legacy stage-two SCI (e.g., SCI message 381).

Figure 6:
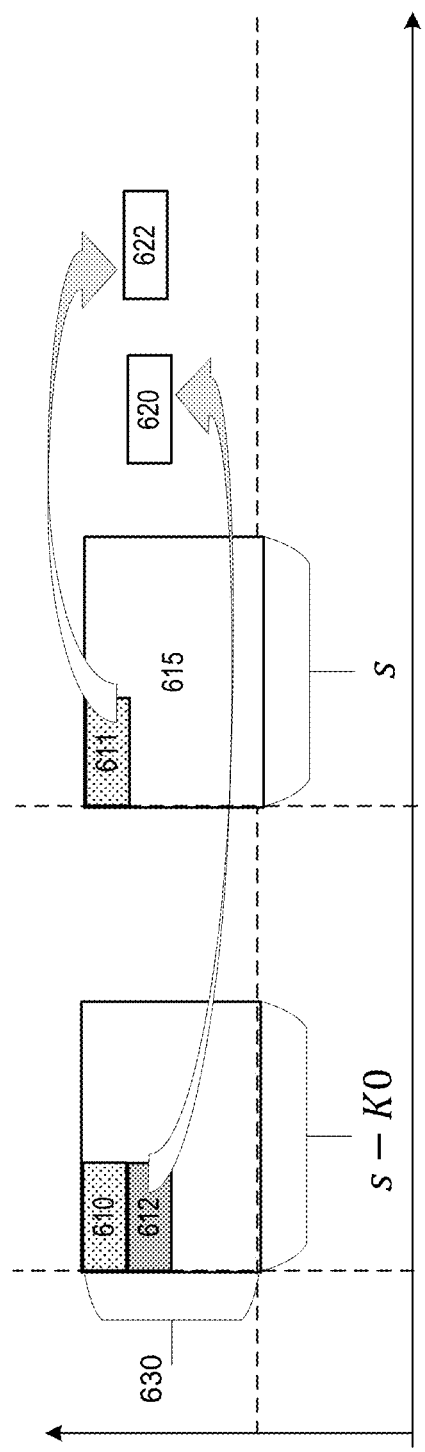
FIG. 6 is a block diagram illustrating an example of separate feedback resources configured for cross-slot schedule implementations in accordance with aspects of the present disclosure.

In aspects, when cross-slot schedule information 375 is piggybacked onto a stage-two SCI message, separate feedback resources may be configured for feedback responses corresponding to PSSCH decoding based on cross-slot schedule information 375 and feedback responses corresponding to PSSCH decoding based on the co-subchannel and same slot SCI (e.g., the stage-two SCI message). FIG. 6 is a block diagram illustrating an example of separate feedback resources configured for cross-slot schedule implementations in accordance with aspects of the present disclosure. As shown in FIG. 6, cross-slot schedule information 612 may be included or piggybacked into stage-two SCI message 610. In this example, cross-slot schedule information 612 may be transmitted to the receiving UE at slot s–K0, with K0>0. At slot s, the receiving UE may receive stage-two SCI message 611 in the same slot as the PSSCH transmission 615. In aspects, the receiving UE may be configured with feedback resource 620 for transmitting a feedback message (e.g., a HARQ feedback message) associated with decoding of PSSCH transmission 615 at slots based on cross-slot schedule information 612. The receiving UE may also be configured with feedback resource 622, separate from feedback resource 620) for transmitting a feedback message (e.g., a HARQ feedback message) associated with decoding of PSSCH transmission 615 at slots based on the information on the legacy stage-two SCI message 611. In this manner, when PSSCH transmission 615 is decoded at slot s based on cross-slot schedule information 612, the receiving UE may transmit a feedback message associated with the decoding of PSSCH transmission 615 on feedback resource 620. However, if the receiving UE fails to receive cross-slot schedule information 612, and PSSCH transmission 615 is decoded at slot s based on stage-two SCI message 611, the receiving UE may transmit a feedback message associated with the decoding of PSSCH transmission 615 on feedback resource 622. In aspects, feedback resource 620 may be configured by cross-slot schedule information 612 received at slot s–K0, and feedback resource 622 may be configured by stage-two SCI message 611 received at slot s, which may be a co-subchannel SCI of PSSCH transmission 615. In some aspects, feedback resource 622 may be used to transmit feedback associated with PSSCH transmission 615 if a discontinuous transmission (DTX) configuration prevents the receiving UE from transmitting the feedback message in feedback resource 620. In alternative or additional aspects, feedback resource 622 may be used to transmit feedback associated with PSSCH transmission 615 to provide diversity.

In aspects, techniques for signaling cross-slot schedule information for piggybacked cross-slot schedule information may include techniques for reducing the number of bits that may be used (or needed) by the piggybacked cross-slot schedule information. In aspects, cross-slot schedule information may be granted for transmission to the receiving UE in the same layer 1 (L1) destination ID from the same L1 source ID and, in this case, the L1 IDs may not need to be duplicated. In this manner, cross-schedule information may be provided with a smaller size. In aspects, information items including MCS, additional MCS table, DMRS pattern, number of DMRS port, stage-two SCI format, and/or Beta-offset indicator may be provided according to various aspects. In aspects, the above information items may be signaled or provided to the receiving UE as a set of default values configured and maintained in layer 3 (L3) and/or layer 2 (L2) configurations. In alternative or additional aspects, the above information items may be signaled or provided to the receiving UE as values in the stage-two SCI attached to the piggybacked cross-slot schedule information.

In aspects, information items including SL process ID, NDI, and/or RV may be provided according to various aspects. In aspects, the above information items may be signaled or provided to the receiving UE as new entries, which may provide more flexibility. In alternative or additional aspects, the above information items may be signaled or provided to the receiving UE according to the values in the stage-two SCI attached to the piggybacked cross-slot schedule information. In some aspects, the piggybacked cross-slot schedule information may include values for the process ID and the NDI to be the same as the process ID and the NDI of the attached stage-two SCI. In aspects, the RV may be set to the next value in a pre-defined RV sequence.

Figure 7:
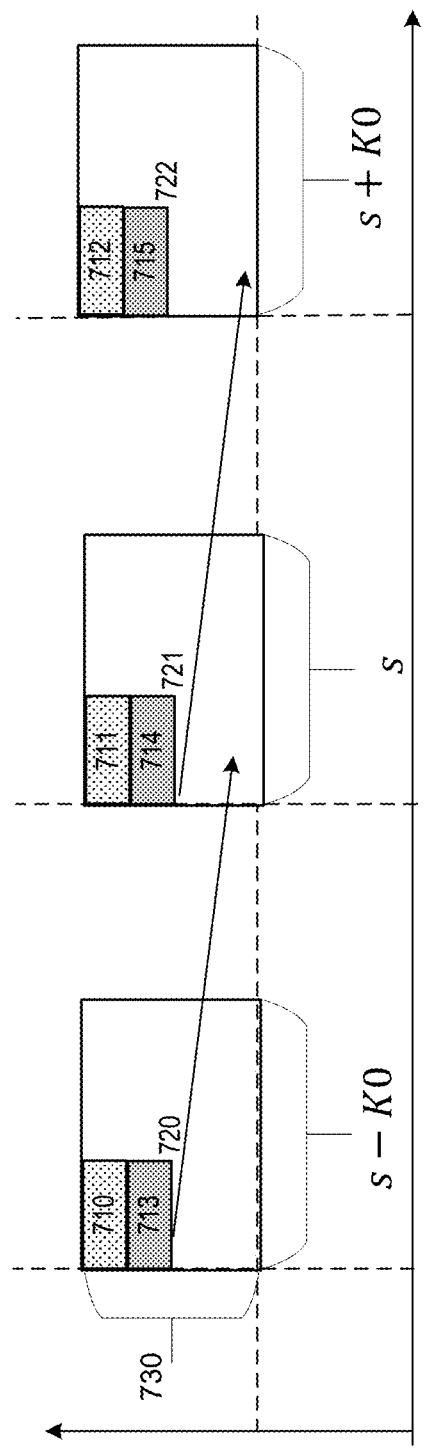
FIG. 7 is a block diagram illustrating an example of standalone stage-two SCI message configured for carrying cross-slot schedule in accordance with aspects of the present disclosure

With reference back to FIG. 3, in some aspects, cross-slot schedule information 375 may be transmitted to receiving UE 115*b* as a standalone stage-two SCI message that may provide control information for a co-subchannel PSSCH transmission. FIG. 7 is a block diagram illustrating an example of standalone stage-two SCI message configured for carrying cross-slot schedule in accordance with aspects of the present disclosure. As shown in FIG. 7, at each of slots s–K0, s, and s+K0, with K0>0, a stage-two SCI may carry cross-slot schedule information, and a PSCCH transmission may carry priority information for co-subchannel PSSCH and reservation fields. For example, at slot s–K0, cross-slot schedule information 713 may represent a stage-two SCI. PSCCH 710 may carry priority information about co-subchannel PSSCH 720. PSCCH 710 may also include a reservation field for subsequent transmissions. In aspects, the remaining items of PSCCH 710, along with cross-slot schedule information 713 may operate to schedule a PSSCH transmission to be received by the receiving UE at a slot occurring K0 slots later. For example, PSCCH 710 and cross-slot schedule information 713 may operate to schedule PSSCH transmission 721 to be received by the receiving UE at slot s. In a similar manner, PSCCH 711 and cross-slot schedule information 714 received at slot s may operate to schedule PSSCH transmission 722 to be received by the receiving UE at slot s+K0.

In some aspects, indicating a scheduled PSSCH transmission(s) at slot s+K0 may include including a one-bit indication in the SCI message received by the receiving UE at slot s (e.g., the slot prior to the slot in which the PSSCH transmission to be decoded using the cross-slot schedule information) pointing to or indicating one of the reservations carried in the PSCCH carrying the SCI message at slot s. In aspects, this indication may also implicitly indicate K0. In some aspects, the indication may be used in a legacy framework when cross-slot schedule may be used for retransmissions of a same transport block. The indication may also be used in dynamic reservations to support cross-slot schedule.

In aspects, the indication may be used in the SCI at slots to point to more than one PSSCH reservations. For example, a PSCCH reservation field may support two reservations. In this case, an indication in the SCI at slots may be used to reserve two subsequent PSSCH transmissions. In aspects, this indication may also implicitly indicate different K0s (e.g., two K0s in the case of two PSSCH reservations). In some aspects, indicating a scheduled PSSCH transmission(s) at slot s+K0 may include including the frequency domain resource assignment (FDRA) of the scheduled PSSCH transmission(s) in the SCI message at slots.

With reference back to FIG. 3, in aspects, transmitting UE 115*a* may obtain a configured grant from base station 105. Subsequent to obtaining the configured grant, transmitting UE 115*a* may use the PC5-RRC interface to indicate receiving UE 115*b* to apply cross-slot schedule to the configured grant sidelink. In this manner, the configured grant sidelink may benefit from low latency. In these aspects, at each configured grant occasion, receiving UE 115*b* may perform cross-slot scheduled PSSCH transmission decoding to benefit from the low-latency approach of the cross-slot scheduled PSSCH transmission decoding of aspects. In this manner, transmitting UE 115*a* may be enable to leverage SCI messages to adjust parameters over the configured grant sidelink.

In aspects, the transmitting UE 115*a* may be configured to negotiate with receiving UE 115*b* to perform cross-occasion schedule. Cross-occasion schedule may differentiate from cross-slot schedule in that cross-occasion schedule may provide for cross-occasion schedule information to be provided to the receiving UE 115*b* with respect to configured grant occasions rather than slots. In this manner, a lower signaling overhead may be required. Additionally, with cross-occasion schedule, there may not be a need to specify TDRA and FDRA in the cross-occasion schedule information. Furthermore, transmitting UE 115*a* may be configured to negotiate with receiving UE 115*b* to only transmit cross-occasion schedule information in the first opportunity within each configured grant occasion.

Figure 8:
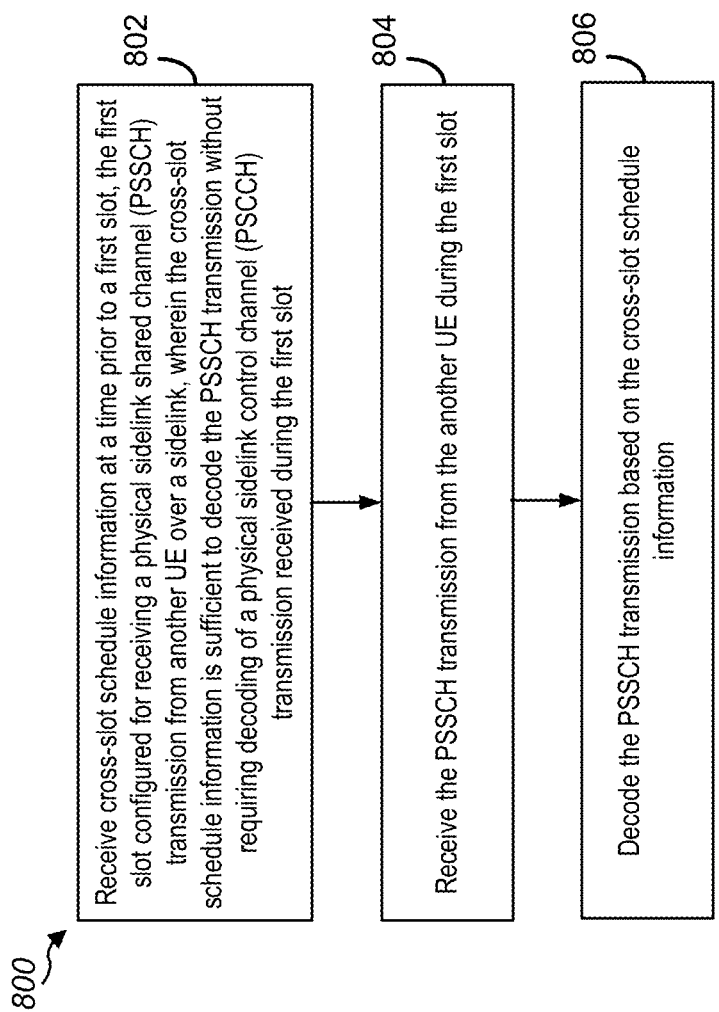
FIG. 8 is a flow diagram illustrating an example process that supports cross-slot scheduling of sidelink transmissions in a wireless communication system according to one or more aspects.
Figure 10:
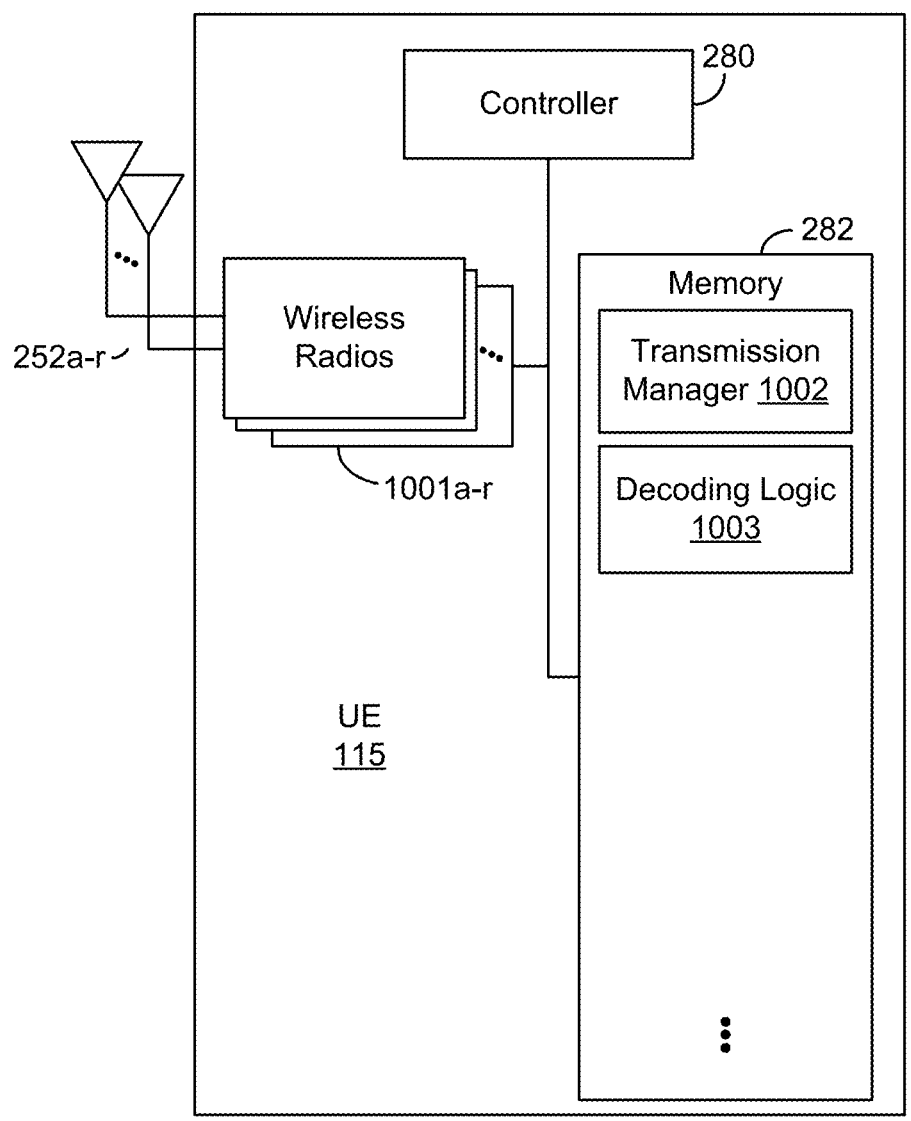
FIG. 10 is a block diagram of an example UE that supports cross-slot scheduling of sidelink transmissions in a wireless communication system according to one or more aspects.

FIG. 8 is a flow diagram illustrating an example process 800 that supports cross-slot scheduling of sidelink transmissions in a wireless communication system according to one or more aspects of the present disclosure. Operations of process 800 may be performed by a UE, such as receiving UE 115*b* described above with reference to FIGS. 1-7, or UE 115 with reference to FIG. 10. For example, example operations (also referred to as "blocks") of process 800 may enable UE 115 to support cross-slot scheduling of sidelink transmissions. FIG. 10 is a block diagram illustrating UE 115 configured according to aspects of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1001*a*-*r* and antennas 252*a*-*r*. Wireless radios 1001*a*-*r* includes various components and hardware, as illustrated in FIG. 2 for UE 115, including modulator/demodulators 254*a*-*r*, MIMO detector 256, receive processor 258, transmit processor 264, and TX MIMO processor 266.

It is noted that in discussion that follows, a UE 115 may be configured as a receiving UE 115*b* and/or a transmitting UE 115*a*. For example, a first UE may be in sidelink communication with a second UE. The first UE may be a transmitting UE configured in a same configuration as UE 115 or UE 115*a* described above, and the second UE may be a receiving UE configured in a same configuration as UE 115 or UE 115*b* described above.

At block 802 of process 800, a UE (e.g., receiving UE 115*b*) receives cross-slot schedule information from a transmitting UE (e.g., UE 115*a*) at a time prior to a first slot. In order to implement the functionality for such operations, UE 115*b*, under control of controller/processor 280, may receive cross-slot schedule information from UE 115*a* at a time prior to a first slot via wireless radios 1001*a*-*r* and antennas 252*a*-*r*. In aspects, the first slot may be configured for receiving a PSSCH transmission from the transmitting UE over a sidelink. The cross-slot schedule information may be sufficient to decode the PSSCH transmission without requiring decoding of a PSCCH transmission received by the receiving UE during the first slot.

In aspects, the cross-slot schedule may include an indication of a sub-channel over which the PSSCH transmission is transmitted from the another UE, an indication of a DMRS scrambling to be used for decoding the PSSCH transmission, a sidelink process number, and NDI, an RV indicator, a DMRS pattern, a number associated with a port of the DMRS, and MCS used on the PSSCH transmission, a table including additional MCS used on the PSSCH transmission, an indication of a format of a stage-2 SCI message transmitted in the PSCCH transmission, a beta-offset indicator, and L1 source ID, and/or an L1 destination ID.

In aspects, the cross-slot schedule information may be piggybacked onto a stage-2 SCI message. For example, receiving UE 115*b* may receive the cross-slot schedule information in at least one SCI message from transmitting UE 115*a*. The at least one SCI message may be part of at least one stage-2 SCI message received during at least one slot prior to the first slot. The PSCCH transmission received during the first slot may include sufficient information to decode the PSSCH transmission received during the first slot.

In some aspects, feedback resources for a PSSCH transmission decoded using piggybacked cross-slot schedule information may be separate from feedback resources for a PSSCH transmission decoded using the co-subchannel same-slot SCI of the PSSCH transmission. For example, receiving UE 115*b* may determine, based on the cross-slot schedule information received in the at least one SCI message prior to the first slot, a first feedback resource for reporting feedback associated with the PSSCH transmission, and may determine, based on the PSCCH transmission received during the first slot, a second feedback resource for reporting feedback associated with the PSSCH transmission. The receiving UE 115b may report the feedback associated with the PSSCH transmission on the second feedback resource when the first feedback resource is unavailable for transmissions due to a discontinuous transmission configuration, and/or may report the feedback associated with the PSSCH transmission on the second feedback to provide diversity to the reporting the feedback associated with the PSSCH transmission on the first feedback.

In aspects, the cross-slot schedule information may be received by receiving UE 115b as a standalone cross-slot schedule information message. For example, the SCI message in which the cross-slot schedule information is received by receiving UE 115b may be a stage-2 SCI message that is separate from a PSCCH transmission received during at least one slot prior to the first slot.

In aspects, the SCI message in which the cross-slot schedule information may be received by receiving UE 115b may include an indicator indicating one or more PSSCH transmissions to be received by the UE The one or more PSSCH transmissions may include the PSSCH transmission to be received during the first slot. In aspects, the indicator may include a one-bit indicator pointing to one or more reservations corresponding to the one or more PSSCH transmissions to be received by the UE, and/or one or more FDRA indications corresponding to the one or more PSSCH transmissions to be received by the UE.

In aspects, the SCI message in which the cross-slot schedule information may be received by receiving UE 115b may include an indication for receiving UE 115b to use an $N_{ID}$ associated with a CRC of a PSSCH transmission received in a same slot in which the at least one SCI message is received for determining a PSSCH DMRS scrambling for decoding the PSSCH transmission.

At block 802 of process 800, UE 115b receives the PSSCH transmission from the transmitting node UE 115a during the first slot. In order to implement the functionality for such operations, UE 115b, under control of controller/processor 280, may receive the PSSCH transmission from UE 115a during the first slot via wireless radios 1001a-r and antennas 252a-r.

At block 804 of process 800, UE 115b decodes the PSSCH transmission based on the cross-slot schedule information. In order to implement the functionality for such operations, the UE, under control of controller/processor 280, executes decoding logic 1003, stored in memory 282. The functionality implemented through the execution environment of decoding logic 1003 allows for the UE to perform PSSCH decoding operations according to the various aspects herein. In aspects, receiving UE 115b may decode the PSSCH transmission concurrently with the PSCCH transmission. In some aspects, when decoding of the PSCCH transmission is unsuccessful, receiving UE 115b may generate a feedback message for the PSSCH transmission based on the cross-slot schedule information regardless of the decoding of the PSCCH transmission being unsuccessful. The feedback message may be transmitted by receiving UE 115b to transmitting UE 115a in a PSFCH transmission, and/or may be transmitted to a base station in a configured sub-slot based PUCCH transmission.

In some aspects, the first slot during which the PSSCH transmission is received occurs within a CG occasion of a CG configuration configured for receiving UE 115b by a base station. In these cases, receiving UE 115b may receive from transmitting UE 115a an indication to apply cross-slot scheduling to the CG configuration. The receiving UE 115b may perform the decoding the PSSCH transmission based on the cross-slot schedule information in response to the indication to apply the cross-slot scheduling to the CG configuration. The receiving UE 115b may receive from transmitting UE 115a a request to apply cross-occasion scheduling to the CG configuration overriding the indication to apply cross-slot scheduling to the CG configuration. In some aspects, the request to apply cross-occasion scheduling to the CG configuration includes a request from transmitting UE 115a to be allowed to only transmit an SCI message including cross-occasion schedule information at a first opportunity within each CG occasion of the CG configuration.

Figure 9:
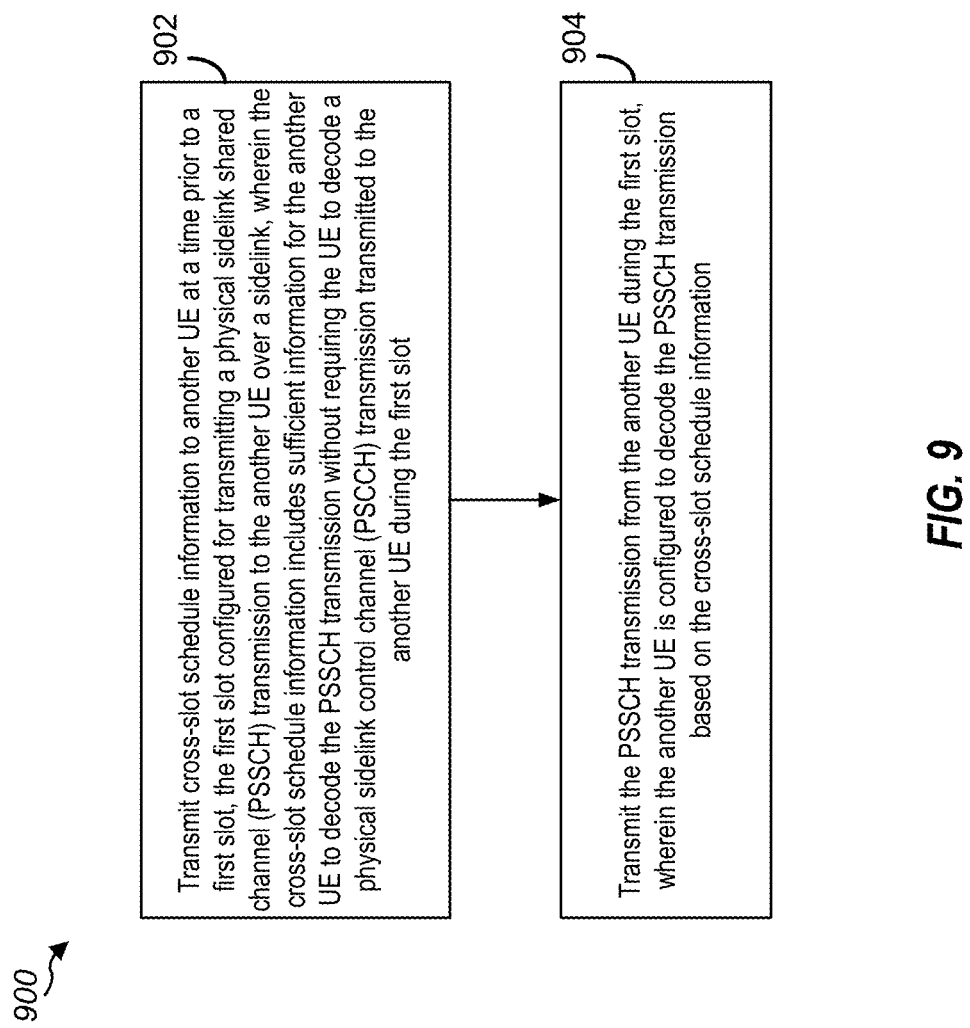
FIG. 9 is a flow diagram illustrating another example process that supports cross-slot scheduling of sidelink transmissions in a wireless communication system according to one or more aspects

FIG. 9 is a flow diagram illustrating an example process 900 that supports cross-slot scheduling of sidelink transmissions in a wireless communication system according to one or more aspects of the present disclosure. Operations of process 800 may be performed by a UE, such as transmitting UE 115a described above with reference to FIGS. 1-7, or UE 115 with reference to FIG. 10.

At block 902 of process 900, a transmitting UE (e.g., transmitting UE 115a) transmits cross-slot schedule information to a receiving UE (e.g., receiving UE 115b) at a time prior to a first slot. In order to implement the functionality for such operations, the UE, under control of controller/processor 280, executes transmission manager 1002, stored in memory 282. The functionality implemented through the execution environment of transmission manager 1002 allows for the UE to perform cross-slot schedule information related operations according to the various aspects herein. In aspects, the first slot may be configured for transmitting a PSSCH transmission to the receiving UE over a sidelink. The cross-slot schedule information may be sufficient for the receiving UE to decode the PSSCH transmission without requiring decoding of a PSCCH transmission received by the receiving UE during the first slot.

In aspects, the cross-slot schedule may include an indication of a sub-channel over which the PSSCH transmission is transmitted from the another UE, an indication of a DMRS scrambling to be used for decoding the PSSCH transmission, a sidelink process number, and NDI, an RV indicator, a DMRS pattern, a number associated with a port of the DMRS, and MCS used on the PSSCH transmission, a table including additional MCS used on the PSSCH transmission, an indication of a format of a stage-2 SCI message transmitted in the PSCCH transmission, a beta-offset indicator, and L1 source ID, and/or an L1 destination ID.

In aspects, the cross-slot schedule information may be piggybacked onto a stage-2 SCI message. For example, transmitting UE 115a may transmit the cross-slot schedule information in at least one SCI message to receiving UE 115b. The at least one SCI message may be part of at least one stage-2 SCI message transmitting during at least one slot prior to the first slot. The PSCCH transmission transmitted during the first slot may include sufficient information for receiving UE 115b to decode the PSSCH transmission received during the first slot.

In some aspects, feedback resources for a PSSCH transmission decoded using piggybacked cross-slot schedule information may be configured separately from feedback resources for a PSSCH transmission decoded using the co-subchannel same-slot SCI of the PSSCH transmission. For example, the cross-slot schedule information may include a first feedback resource for reporting feedback associated with the PSSCH transmission, and may include a second feedback resource for reporting feedback associated with the PSSCH transmission. Transmitting UE 115a may receive from receiving UE 115b a report of the feedback associated with the PSSCH transmission on the second feedback resource when the first feedback resource is unavailable for transmissions due to a discontinuous transmission configuration, and/or may receive from receiving UE 115b a report of the feedback associated with the PSSCH transmission on the second feedback to provide diversity to the reporting the feedback associated with the PSSCH transmission on the first feedback.

In aspects, the cross-slot schedule information may be transmitted by transmitting UE 115a as a standalone cross-slot schedule information message. For example, the SCI message in which the cross-slot schedule information is transmitted to receiving UE 115b may be a stage-2 SCI message that is separate from a PSCCH transmission received by receiving UE 115b during at least one slot prior to the first slot.

In aspects, the SCI message in which the cross-slot schedule information may be transmitted to receiving UE 115b may include an indicator indicating one or more PSSCH transmissions to be received by the UE The one or more PSSCH transmissions may include the PSSCH transmission to be received during the first slot by the receiving UE 115b. In aspects, the indicator may include a one-bit indicator pointing to one or more reservations corresponding to the one or more PSSCH transmissions transmitted by transmitting UE 115a to be received by receiving UE 115b, and/or one or more FDRA indications corresponding to the one or more PSSCH transmissions to be transmitted by transmitting UE 115a.

In aspects, the SCI message in which the cross-slot schedule information may be transmitted to receiving UE 115b may include an indication for receiving UE 115b to use an $N_{ID}$ associated with a CRC of a PSSCH transmission received by receiving UE 115b in a same slot in which the at least one SCI message is received by receiving UE 115b for determining a PSSCH DMRS scrambling for decoding the PSSCH transmission.

At block 902 of process 900, transmitting UE 115a transmits the PSSCH transmission to the receiving UE 115b during the first slot. In order to implement the functionality for such operations, UE 115a, under control of controller/processor 280, may transmit the PSSCH transmission to receiving UE 115b during the first slot via wireless radios 1001a-r and antennas 252a-r. In aspects, receiving UE 115b may be configured to decode the PSSCH transmission based on the cross-slot schedule information.

In aspects, receiving UE 115b may be configured to decode the PSSCH transmission concurrently with decoding the PSCCH transmission. In some aspects, when decoding of the PSCCH transmission is unsuccessful, receiving UE 115b may generate a feedback message for the PSSCH transmission based on the cross-slot schedule information regardless of the decoding of the PSCCH transmission being unsuccessful. The feedback message may be received by transmitting UE 115a from receiving UE 115b in a PSFCH transmission, and/or may be transmitted by receiving UE 115b to a base station in a configured sub-slot based PUCCH transmission.

In some aspects, the first slot during which the PSSCH transmission is transmitted occurs within a CG occasion of a CG configuration configured for receiving UE 115b by a base station. In these cases, transmitting UE 115a may transmit to receiving UE 115b an indication to apply cross-slot scheduling to the CG configuration. The receiving UE 115b may perform the decoding the PSSCH transmission based on the cross-slot schedule information in response to the indication to apply the cross-slot scheduling to the CG configuration. The transmitting UE 115a may transmit to receiving UE 115b a request to apply cross-occasion scheduling to the CG configuration overriding the indication to apply cross-slot scheduling to the CG configuration. In some aspects, the request to apply cross-occasion scheduling to the CG configuration includes a request from transmitting UE 115a to be allowed to only transmit an SCI message including cross-occasion schedule information at a first opportunity within each CG occasion of the CG configuration.

In one or more aspects, techniques for supporting cross-slot scheduling of sidelink transmissions in a wireless communication system according to one or more aspects may include additional aspects, such as any single aspect or any combination of aspects described below or in connection with one or more other processes or devices described elsewhere herein. In a first aspect, supporting cross-slot scheduling of sidelink transmissions in a wireless communication system may include an apparatus configured to receive cross-slot schedule information at a time prior to a first slot, the first slot configured for receiving a PSSCH transmission from another UE over a sidelink. In aspects, the cross-slot schedule information is sufficient to decode the PSSCH transmission without requiring decoding of a PSCCH transmission received during the first slot. The apparatus is also configured to receive the PSSCH transmission from the another UE during the first slot, and to decode the PSSCH transmission based on the cross-slot schedule information. Additionally, the apparatus may perform or operate according to one or more aspects as described below. In some implementations, the apparatus includes a wireless device, such as a receiving UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the cross-slot schedule includes an indication of a sub-channel over which the PSSCH transmission is transmitted from the another UE, an indication of a DMRS scrambling to be used for decoding the PSSCH transmission, a sidelink process number, and NDI, an RV indicator, a DMRS pattern, a number associated with a port of the DMRS, and MCS used on the PSSCH transmission, a table including additional MCS used on the PSSCH transmission, an indication of a format of a stage-2 SCI message transmitted in the PSCCH transmission, a beta-offset indicator, and L1 source ID, and/or an L1 destination ID.

In a third aspect, alone or in combination with one or more of the first aspect or the second aspect, receiving the cross-slot schedule information includes receiving the cross-slot schedule information in at least one SCI message from the another UE.

In a fourth aspect, alone or in combination with one or more of the first aspect through the third aspect, the at least one SCI message is part of at least one stage-2 SCI message received during at least one slot prior to the first slot, the at least one stage-2 SCI message received during at least one slot prior to the first slot including control information for at least one PSSCH transmission concurrently received during the at least one slot prior to the first slot.

In a fifth aspect, alone or in combination with the fourth aspect, the PSCCH transmission received during the first slot includes sufficient information to decode the PSSCH transmission received during the first slot.

In a sixth aspect, alone or in combination with one or more of the first aspect through the fifth aspect, the techniques of the first aspect include determining, based on the cross-slot schedule information received in the at least one SCI message prior to the first slot, a first feedback resource for reporting feedback associated with the PSSCH transmission.

In a seventh aspect, alone or in combination with the sixth aspect, the techniques of the first aspect include determining, based on the PSCCH transmission received during the first slot, a second feedback resource for reporting feedback associated with the PSSCH transmission.

In an eighth aspect, alone or in combination with one or more of the first aspect through the seventh aspect, the techniques of the first aspect include reporting the feedback associated with the PSSCH transmission on the second feedback resource when the first feedback resource is unavailable for transmissions due to a discontinuous transmission configuration.

In a ninth aspect, alone or in combination with the eighth aspect, the techniques of the first aspect include reporting the feedback associated with the PSSCH transmission on the second feedback to provide diversity to the reporting the feedback associated with the PSSCH transmission on the first feedback.

In a tenth aspect, alone or in combination with one or more of the first aspect through the ninth aspect, the at least one SCI message is at least one stage-2 SCI message that is separate from a PSCCH transmission received during at least one slot prior to the first slot.

In an eleventh aspect, alone or in combination with the tenth aspect, information in the PSCCH transmission received during at least one slot prior to the first slot and the separate at least one stage-2 SCI message are configured to schedule the PSSCH transmission received during the first slot.

In a twelfth aspect, alone or in combination with one or more of the first aspect through the eleventh aspect, the at least one SCI message includes an indicator indicating one or more PSSCH transmissions to be received by the UE.

In a thirteenth aspect, alone or in combination with the twelfth aspect, the one or more PSSCH transmissions include the PSSCH transmission to be received during the first slot.

In a fourteenth aspect, alone or in combination with one or more of the twelfth aspect through the thirteenth aspect, the indicator includes a one-bit indicator pointing to one or more reservations corresponding to the one or more PSSCH transmissions to be received by the UE.

In a fifteenth aspect, alone or in combination with one or more of the twelfth aspect through the fourteenth aspect, the indicator includes one or more FDRA indications corresponding to the one or more PSSCH transmissions to be received by the UE.

In a sixteenth aspect, alone or in combination with one or more of the first aspect through the fifteenth aspect, the at least one SCI message includes an indication for the UE to use a $N_{ID}$ associated with a CRC of a PSSCH transmission received in a same slot in which the at least one SCI message is received for determining a PSSCH DMRS scrambling for decoding the PSSCH transmission.

In a seventeenth aspect, alone or in combination with one or more of the first aspect through the sixteenth aspect, the techniques of the first aspect include receiving the PSCCH transmission from the another UE during the first slot.

In an eighteenth aspect, alone or in combination with one or more of the first aspect through the seventeenth aspect, the techniques of the first aspect include decoding the PSCCH transmission concurrently with the decoding of the PSSCH transmission.

In a nineteenth aspect, alone or in combination with one or more of the first aspect through the eighteenth aspect, decoding of the PSCCH transmission is unsuccessful.

In a twentieth aspect, alone or in combination with the nineteenth aspect, the techniques of the first aspect include generating a feedback message for the PSSCH transmission based on the cross-slot schedule information regardless of the decoding of the PSCCH transmission being unsuccessful.

In a twenty-first aspect, alone or in combination with one or more of the first aspect through the twentieth aspect, the techniques of the first aspect include transmitting the feedback message to the another UE in a PSFCH transmission.

In a twenty-second aspect, alone or in combination with one or more of the first aspect through the twenty-first aspect, the techniques of the first aspect include transmitting the feedback message to a base station in a configured sub-slot based PUCCH transmission.

In a twenty-third aspect, alone or in combination with one or more of the first aspect through the twenty-second aspect, the first slot during which the PSSCH transmission is received occurs within a CG occasion of a CG configuration configured by a base station.

In a twenty-fourth aspect, alone or in combination with the twenty-third aspect, the techniques of the first aspect include receiving, from the another UE, an indication to apply cross-slot scheduling to the CG configuration.

In a twenty-fifth aspect, alone or in combination with one or more of the twenty-third aspect through the twenty-fourth aspect, the UE performs the decoding the PSSCH transmission based on the cross-slot schedule information in response to the indication to apply the cross-slot scheduling to the CG configuration.

In a twenty-sixth aspect, alone or in combination with one or more of the first aspect through the twenty-fifth aspect, the techniques of the first aspect include receiving, from the another UE, a request to apply cross-occasion scheduling to the CG configuration.

In a twenty-seventh aspect, alone or in combination with the twenty-sixth aspect, the request to apply cross-occasion scheduling to the CG configuration overrides the indication to apply cross-slot scheduling to the CG configuration.

In a twenty-eighth aspect, alone or in combination with one or more of the first aspect through the twenty-seventh aspect, the request to apply cross-occasion scheduling to the CG configuration includes a request from the another UE to be allowed to only transmit an SCI message including cross-occasion schedule information at a first opportunity within each CG occasion of the CG configuration.

In a twenty-ninth aspect, supporting cross-slot scheduling of sidelink transmissions in a wireless communication system may include an apparatus configured to transmit cross-slot schedule information to another UE at a time prior to a first slot, the first slot configured for transmitting a PSSCH transmission to the another UE over a sidelink. In aspects, the cross-slot schedule information includes sufficient information for the another UE to decode the PSSCH transmission without requiring the another UE to decode a PSCCH transmission transmitted to the another UE during the first slot. The apparatus is also configured to transmit the PSSCH transmission to the another UE during the first slot. In aspects, the another UE is configured to decode the PSSCH transmission based on the cross-slot schedule information. Additionally, the apparatus may perform or operate according to one or more aspects as described below. In some implementations, the apparatus includes a wireless device, such as a transmitting UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a thirtieth aspect, alone or in combination with the twenty-ninth aspect, the cross-slot schedule includes an indication of a sub-channel over which the PSSCH transmission is transmitted from the another UE, an indication of a DMRS scrambling to be used for decoding the PSSCH transmission, a sidelink process number, and NDI, an RV indicator, a DMRS pattern, a number associated with a port of the DMRS, and MCS used on the PSSCH transmission, a table including additional MCS used on the PSSCH transmission, an indication of a format of a stage-2 SCI message transmitted in the PSCCH transmission, a beta-offset indicator, and L1 source ID, and/or an L1 destination ID.

In a thirty-first aspect, alone or in combination with one or more of the twenty-ninth aspect through the thirtieth aspect, transmitting the cross-slot schedule information includes transmitting the cross-slot schedule information in at least one SCI message to the another UE.

In a thirty-second aspect, alone or in combination with one or more of the twenty-ninth aspect through the thirty-first aspect, the at least one SCI message is part of at least one stage-2 SCI message transmitted during at least one slot prior to the first slot, the at least one stage-2 SCI message transmitted during at least one slot prior to the first slot including control information for at least one PSSCH transmission concurrently transmitted during the at least one slot prior to the first slot.

In a thirty-third aspect, alone or in combination with the thirty-second aspect, the PSCCH transmission transmitted during the first slot includes sufficient information for the another UE to decode the PSSCH transmission transmitted during the first slot.

In a thirty-fourth aspect, alone or in combination with one or more of the twenty-ninth aspect through the thirty-third aspect, the techniques of the twenty-ninth aspect include including, in the cross-slot schedule information transmitted in the at least one SCI message prior to the first slot, a first feedback resource for the another UE to report feedback associated with the PSSCH transmission.

In a thirty-fifth aspect, alone or in combination with one or more of the twenty-ninth aspect through the thirty-fourth aspect, the techniques of the twenty-ninth aspect include including, in the cross-slot schedule information transmitted in the at least one SCI message prior to the first slot, a second feedback resource for the another UE to report feedback associated with the PSSCH transmission.

In a thirty-sixth aspect, alone or in combination with one or more of the twenty-ninth aspect through the thirty-fifth aspect, the techniques of the twenty-ninth aspect include receiving, from the another UE, a report of the feedback associated with the PSSCH transmission on the second feedback resource when the first feedback resource is unavailable for transmissions from the another UE due to a discontinuous transmission configuration.

In a thirty-seventh aspect, alone or in combination with one or more of the twenty-ninth aspect through the thirty-sixth aspect, the techniques of the twenty-ninth aspect include receiving, from the another UE, a report of the feedback associated with the PSSCH transmission on the second feedback to provide diversity to the reporting of the feedback associated with the PSSCH transmission on the first feedback.

In a thirty-eighth aspect, alone or in combination with one or more of the twenty-ninth aspect through the thirty-seventh aspect, the at least one SCI message is at least one stage-2 SCI message that is separate from a PSCCH transmission transmitted during at least one slot prior to the first slot.

In a thirty-ninth aspect, alone or in combination with the thirty-eighth aspect, the techniques of the twenty-ninth aspect include configuring information in the PSCCH transmission transmitted during at least one slot prior to the first slot and the separate at least one stage-2 SCI message to schedule the PSSCH transmission during the first slot.

In a fortieth aspect, alone or in combination with one or more of the twenty-ninth aspect through the thirty-ninth aspect, the techniques of the twenty-ninth aspect include including, in the at least one SCI message, an indicator indicating one or more PSSCH transmissions to be transmitted by the UE to the another UE.

In a forty-first aspect, alone or in combination with the fortieth aspect, the one or more PSSCH transmissions includes the PSSCH transmission transmitted during the first slot.

In a forty-second aspect, alone or in combination with one or more of the fortieth aspect through the forty-first aspect, the indicator includes a one-bit indicator pointing to one or more reservations corresponding to the one or more PSSCH transmissions to be transmitted by the UE to the another UE.

In a forty-third aspect, alone or in combination with one or more of the fortieth aspect through the forty-second aspect, the indicator includes one or more FDRA indications corresponding to the one or more PSSCH transmissions to be transmitted by the UE to the another UE.

In a forty-fourth aspect, alone or in combination with one or more of the twenty-ninth aspect through the forty-third aspect, the techniques of the twenty-ninth aspect include including, in the at least one SCI message, an indication for the another UE to use a $N_{ID}$ associated with a CRC of a PSSCH transmission transmitted in a same slot in which the at least one SCI message is transmitted to the another UE for determining a PSSCH DMRS scrambling for decoding the PSSCH transmission transmitted during the first slot.

In a forty-fifth aspect, alone or in combination with one or more of the twenty-ninth aspect through the forty-fourth aspect, the techniques of the twenty-ninth aspect include transmitting the PSCCH transmission to the another UE during the first slot, wherein the another UE is configured to decode the PSCCH transmission concurrently with the decoding of the PSSCH transmission.

In a forty-sixth aspect, alone or in combination with one or more of the twenty-ninth aspect through the forty-fifth aspect, the another UE is configured to generate a feedback message for the PSSCH transmission based on the cross-slot schedule information regardless of a failure by the another UE to decode the PSCCH transmission.

In a forty-seventh aspect, alone or in combination with one or more of the twenty-ninth aspect through the forty-sixth aspect, the another UE is configured to transmit the feedback message to the UE in a PSFCH transmission.

In a forty-eighth aspect, alone or in combination with one or more of the twenty-ninth aspect through the forty-seventh aspect, the another UE is configured to transmit the feedback message to a base station in a configured sub-slot based PUCCH transmission.

In a forty-ninth aspect, alone or in combination with one or more of the twenty-ninth aspect through the forty-eighth aspect, the first slot during which the PSSCH transmission is transmitted occurs within a CG occasion of a CG configuration configured by a base station.

In a fiftieth aspect, alone or in combination with the forty-ninth aspect, the techniques of the twenty-ninth aspect include transmitting, to the another UE, an indication to apply cross-slot scheduling to the CG configuration.

In a fifty-first aspect, alone or in combination with one or more of the forty-ninth aspect through the fiftieth aspect, the another UE is configured to perform decoding of the PSSCH transmission based on the cross-slot schedule information in response to the indication to apply the cross-slot scheduling to the CG configuration.

In a fifty-second aspect, alone or in combination with one or more of the twenty-ninth aspect through the fifty-first aspect, the techniques of the twenty-ninth aspect include transmitting, to the another UE, a request to apply cross-occasion scheduling to the CG configuration.

In a fifty-third aspect, alone or in combination with the fifty-second aspect, the request to apply cross-occasion scheduling to the CG configuration overrides the indication to apply cross-slot scheduling to the CG configuration.

In a fifty-fourth aspect, alone or in combination with one or more of the twenty-ninth aspect through the fifty-third aspect, the request to apply cross-occasion scheduling to the CG configuration includes a request to the another UE to allow only transmitting an SCI message including cross-occasion schedule information at a first opportunity within each CG occasion of the CG configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
    receiving cross-slot schedule information in at least one sidelink control information (SCI) message from another UE at a time prior to a first slot, the first slot configured for receiving a physical sidelink shared channel (PSSCH) transmission from the another UE over a sidelink, wherein the cross-slot schedule information is sufficient to decode the PSSCH transmission without requiring decoding of a physical sidelink control channel (PSCCH) transmission received during the first slot;
    receiving the PSSCH transmission from the another UE during the first slot; and decoding the PSSCH transmission based on the cross-slot schedule information, wherein the at least one SCI message includes an indication for the UE to use a cell identification ($N_{ID}$) associated with a cyclic redundancy check (CRC) of a PSSCH transmission received in a same slot in which the at least one SCI message is received for determining a PSSCH demodulation reference signal (DMRS) scrambling for decoding the PSSCH transmission.

2. The method of claim 1, wherein the cross-slot schedule information includes one or more parameters configured to facilitate decoding the PSSCH transmission, wherein the one or more parameters include one or more of:
an indication of a sub-channel over which the PSSCH transmission is transmitted from the another UE;
an indication of a demodulation reference signal (DMRS) scrambling to be used for decoding the PSSCH transmission;
a sidelink process number;
a new data indicator (NDI);
a redundant version (RV) indicator;
a DMRS pattern;
a number associated with a port of the DMRS;
a table including additional MCS used on the PSSCH transmission;
an indication of a format of a stage-2 sidelink control information (SCI) message transmitted in the PSCCH transmission;
a beta-offset indicator;
a level 1 (L1) source identification (ID); or
an L1 destination ID.

3. The method of claim 1, wherein the at least one SCI message is part of at least one stage-2 SCI message received during at least one slot prior to the first slot, the at least one stage-2 SCI message received during at least one slot prior to the first slot including control information for at least one PSSCH transmission concurrently received during the at least one slot prior to the first slot, and wherein the PSCCH transmission received during the first slot includes sufficient information to decode the PSSCH transmission received during the first slot.

4. The method of claim 3, further comprising:
determining, based on the cross-slot schedule information received in the at least one SCI message prior to the first slot, a first feedback resource for reporting feedback associated with the PSSCH transmission; and
determining, based on the PSCCH transmission received during the first slot, a second feedback resource for reporting feedback associated with the PSSCH transmission.

5. The method of claim 4, further comprising:
reporting the feedback associated with the PSSCH transmission on the second feedback resource when the first feedback resource is unavailable for transmissions due to a discontinuous transmission configuration; or
reporting the feedback associated with the PSSCH transmission on the second feedback to provide diversity to the reporting the feedback associated with the PSSCH transmission on the first feedback.

6. The method of claim 1, wherein the at least one SCI message is at least one stage-2 SCI message that is separate from a PSCCH transmission received during at least one slot prior to the first slot, wherein information in the PSCCH transmission received during at least one slot prior to the first slot and the separate at least one stage-2 SCI message are configured to schedule the PSSCH transmission received during the first slot.

7. The method of claim 1, wherein the at least one SCI message includes an indicator indicating one or more PSSCH transmissions to be received by the UE, the one or more PSSCH transmissions including the PSSCH transmission to be received during the first slot, the indicator including one or more of:
a one-bit indicator pointing to one or more reservations corresponding to the one or more PSSCH transmissions to be received by the UE; or
one or more frequency domain resource allocation (FDRA) indications corresponding to the one or more PSSCH transmissions to be received by the UE.

8. The method of claim 1, further comprising:
receiving the PSCCH transmission from the another UE during the first slot; and
decoding the PSCCH transmission concurrently with the decoding of the PSSCH transmission.

9. The method of claim 8, wherein decoding of the PSCCH transmission is unsuccessful, and further comprising:
generating a feedback message for the PSSCH transmission based on the cross-slot schedule information regardless of the decoding of the PSCCH transmission being unsuccessful.

10. The method of claim 9, further comprising one of:
transmitting the feedback message to the another UE in a physical sidelink feedback channel (PSFCH) transmission; or
transmitting the feedback message to a base station in a configured sub-slot based physical uplink control channel (PUCCH) transmission.

11. The method of claim 1, wherein the first slot during which the PSSCH transmission is received occurs within a configured grant (CG) occasion of a CG configuration configured by a base station, and further comprising:
receiving, from the another UE, an indication to apply cross-slot scheduling to the CG configuration, wherein the UE performs the decoding of the PSSCH transmission based on the cross-slot schedule information in response to the indication to apply the cross-slot scheduling to the CG configuration.

12. The method of claim 11, further comprising:
receiving, from the another UE, a request to apply cross-occasion scheduling to the CG configuration, wherein the request to apply cross-occasion scheduling to the CG configuration overrides the indication to apply cross-slot scheduling to the CG configuration.

13. The method of claim 11, wherein the indication to apply cross-occasion scheduling to the CG configuration includes a request from the another UE to be allowed to only transmit an SCI message including cross-occasion schedule information at a first opportunity within each CG occasion of the CG configuration.

14. A method of wireless communication performed by a user equipment (UE), the method comprising:
transmitting cross-slot schedule information in at least one sidelink control information (SCI) message to another UE at a time prior to a first slot, the first slot configured for transmitting a physical sidelink shared channel (PSSCH) transmission to the another UE over a sidelink, wherein the cross-slot schedule information includes sufficient information for the another UE to decode the PSSCH transmission without requiring the another UE to decode a physical sidelink control channel (PSCCH) transmission transmitted to the another UE during the first slot; and transmitting the PSSCH transmission to the another UE during the first slot, wherein the another UE is configured to decode the PSSCH transmission based on the cross-slot schedule information, wherein the at least one SCI message includes an indication for the UE to use a cell identification ($N_{ID}$) associated with a cyclic redundancy check (CRC) of a PSSCH transmission received in a same slot in which the at least one SCI message is received for determining a PSSCH demodulation reference signal (DMRS) scrambling for decoding the PSSCH transmission.

15. The method of claim 14, wherein the cross-slot schedule information includes one or more parameters to facilitate decoding the PSSCH transmission, wherein the one or more parameters include one or more of:
an indication of a sub-channel over which the PSSCH transmission is transmitted to the another UE;
an indication of a demodulation reference signal (DMRS) scrambling to be used by the another UE for decoding the PSSCH transmission;
a sidelink process number;
a new data indicator (NDI);
a redundant version (RV) indicator;
a DMRS pattern;
a number associated with a port of the DMRS;
a table including additional MCS used on the PSSCH transmission;
an indication of a format of a stage-2 sidelink control information (SCI) message transmitted in the PSCCH transmission;
a beta-offset indicator;
a level 1 (L1) source identification (ID); or
an L1 destination ID.

16. The method of claim 14, wherein the at least one SCI message is part of at least one stage-2 SCI message transmitted during at least one slot prior to the first slot, the at least one stage-2 SCI message transmitted during at least one slot prior to the first slot including control information for at least one PSSCH transmission concurrently transmitted during the at least one slot prior to the first slot, and wherein the PSCCH transmission transmitted during the first slot includes sufficient information for the another UE to decode the PSSCH transmission transmitted during the first slot.

17. The method of claim 16, further comprising:
including, in the cross-slot schedule information transmitted in the at least one SCI message prior to the first slot, a first feedback resource for the another UE to report feedback associated with the PSSCH transmission; and
including, in the cross-slot schedule information transmitted in the at least one SCI message prior to the first slot, a second feedback resource for the another UE to report feedback associated with the PSSCH transmission.

18. The method of claim 17, further comprising:
receiving, from the another UE, a report of the feedback associated with the PSSCH transmission on the second feedback resource when the first feedback resource is unavailable for transmissions from the another UE due to a discontinuous transmission configuration; or
receiving, from the another UE, a report of the feedback associated with the PSSCH transmission receiving, from the another UE, a report of the feedback associated with the PSSCH transmission on the second feedback to provide diversity to the reporting of the feedback associated with the PSSCH transmission on the first feedback.

19. The method of claim 14, wherein the at least one SCI message is at least one stage-2 SCI message that is separate from a PSCCH transmission transmitted during at least one slot prior to the first slot, and further comprising configuring information in the PSCCH transmission transmitted during at least one slot prior to the first slot and the separate at least one stage-2 SCI message to schedule the PSSCH transmission during the first slot.

20. The method of claim 14, further comprising including, in the at least one SCI message, an indicator indicating one or more PSSCH transmissions to be transmitted by the UE to the another UE, the one or more PSSCH transmissions including the PSSCH transmission transmitted during the first slot, the indicator including one or more of:
a one-bit indicator pointing to one or more reservations corresponding to the one or more PSSCH transmissions to be transmitted by the UE to the another UE; or
one or more frequency domain resource allocation (FDRA) indications corresponding to the one or more PSSCH transmissions to be transmitted by the UE to the another UE.

21. The method of claim 14, further comprising:
transmitting the PSCCH transmission to the another UE during the first slot, wherein the another UE is configured to decode the PSCCH transmission concurrently with the decoding of the PSSCH transmission.

22. The method of claim 21, wherein the another UE is configured to generate a feedback message for the PSSCH transmission based on the cross-slot schedule information regardless of a failure by the another UE to decode the PSCCH transmission.

23. The method of claim 22, wherein the another UE is configured to one of:
transmit the feedback message to the UE in a physical sidelink feedback channel (PSFCH) transmission; or
transmit the feedback message to a base station in a configured sub-slot based physical uplink control channel (PUCCH) transmission.

24. The method of claim 14, wherein the first slot during which the PSSCH transmission is transmitted occurs within a configured grant (CG) occasion of a CG configuration configured by a base station, and further comprising:
transmitting, to the another UE, an indication to apply cross-slot scheduling to the CG configuration, wherein the another UE is configured to perform decoding of the PSSCH transmission based on the cross-slot schedule information in response to the indication to apply the cross-slot scheduling to the CG configuration.

25. The method of claim 24, further comprising:
transmitting, to the another UE, a request to apply cross-occasion scheduling to the CG configuration, wherein the request to apply cross-occasion scheduling to the CG configuration overrides the indication to apply cross-slot scheduling to the CG configuration.

26. The method of claim 25, wherein the request to apply cross-occasion scheduling to the CG configuration includes a request to the another UE to allow only transmitting an SCI message including cross-occasion schedule information at a first opportunity within each CG occasion of the CG configuration.

* * * * *